United States Patent Office 3,639,614
Patented Feb. 1, 1972

3,639,614
ARYLTHIETE-1,1-DIOXIDES AS ANTI-INFLAMMATORY AGENTS
Melvin Harris Rosen, Madison, and Herbert Morton Blatter, Springfield, N.J., assignors to Ciba-Geigy Corporation, Summit, N.J.
No Drawing. Filed Oct. 17, 1968, Ser. No. 768,525
Int. Cl. A61k 27/00
U.S. Cl. 424—275
1 Claim

ABSTRACT OF THE DISCLOSURE 2-aryl-3-amino-thiete-1,1-dioxides, e.g. those of the formula

$R_1$ = halogenated phenyl or heterocyclic aryl
Am = tert. amino
$R_2$ = H, alkyl, aralkyl or aryl exhibit anti-inflammatory effects.

SUMMARY OF THE INVENTION

The present invention concerns and has for its object the provision of new 2-aryl-3-amino-2H- and -4H-thiete-1,1-dioxides, more particularly of those of Formulae I and II

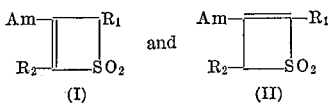

in which $R_1$ is a halogenated phenyl or monocyclic heterocyclic aryl radical, Am is a tertiary amino group and $R_2$ is hydrogen or a lower alkyl, aralkyl or aryl radical, of corresponding pharmaceutical compositions and of methods for the preparation and application of these products. Said compositions are useful anti-inflammatory agents in the treatment or management of arthritic and dermatopathologic conditions.

DESCRIPTION OF THE PREFERRED EMBODIMENTS

A halogenated phenyl radical $R_1$ is preferably such containing up to 3 fluorine, chlorine or bromine atoms. An iso- or heterocyclic aryl radical $R_1$ or $R_2$ represents preferably monocyclic isocyclic or monooxa-, monothia- or monoazacyclic aryl radicals. These, as well as the halogenated phenyl radical, are unsubstituted or substituted by one or more than one, preferably by 1 or 2, of the same or of different substituents, for example, by lower alkyl, such as methyl, ethyl, n- or i-propyl or -butyl, free, etherified or esterified hydroxy or mercapto groups, such as lower alkoxy or alkylmercapto, e.g. methoxy, ethoxy, n- or i-propoxy or -butoxy, halogeno, e.g. fluoro, chloro or bromo, trifluoromethyl, nitro or amino, especially di-lower alkylamino, e.g. dimethylamino or diethylamino. The term "lower" referred to above and hereinafter in connection with organic radicals or compounds respectively, defines such with up to 7, preferably up to 4, carbon atoms.

Preferred radicals $R_1$ are (halogeno)$_m$-phenyl, (halogeno)$_n$-(lower alkyl)-phenyl, (halogeno)$_n$-(lower alkoxy)-phenyl, (halogeno)$_n$(lower alkylmercapto)-phenyl, (halogeno)$_n$-(nitro)-phenyl, (halogeno)$_n$-(di-lower alkylamino)-phenyl, furyl, (lower alkyl)-furyl, thienyl, (lower alkyl)-thienyl, pyridyl or (lower alkyl)-pyridyl, wherein $m$ is an integer from 1 to 3 and $n$ is the integer 1 or 2. Preferred aralkyl or aryl radicals $R_2$ are represented by Ar-lower alkyl and Ar, wherein Ar is phenyl, (lower alkyl)-phenyl, (lower alkoxy)-phenyl, (lower alkylmercapto)-phenyl, (halogeno)-phenyl, (trifluoromethyl)-phenyl, (nitro)-phenyl, (di-lower alkylamino)-phenyl, furyl, (lower alkyl)-furyl, thienyl, (lower alkyl)-thienyl, pyridyl or (lower alkyl)-pyridyl.

The tertiary amino group Am represents preferably di-lower alkylamino, e.g. dimethylamino, N-methyl-N-ethylamino, diethylamino, di-n-propylamino, di-isopropylamino or di-n-butylamino, but also, for example, lower alkyleneimino or monooxa-, monothia- or monoaza-lower alkyleneimino, e.g. ethyleneimino, pyrrolidino, 2-methyl-pyrrolidino, piperidino, 2- or 4-methyl-piperidino, 1,6- or 2,5-hexamethyleneimino, 1,7- or 2,6-heptamethyleneimino; morpholino, 3-methyl-morpholino or thiamorpholino; piperazino, 4-(methyl, ethyl, n-propyl or i-propyl)-piperazino, 3-(methyl, ethyl or n-propyl)-3-aza-1,5- or 1,6-hexyleneimino or 4-methyl-4-aza-1,7- or 2,6-heptyleneimino. In the above amino groups two hetero-atoms are separated by at least 2 carbon atoms.

A lower alkyl group $R_2$ is preferably methyl, but also, for example, ethyl, n- or i-propyl, -butyl, -pentyl, -hexyl or -heptyl.

The compounds of the invention possess valuable pharmacological properties. For example, they exhibit anti-inflammatory effects, as can be demonstrated in animal tests, using advantageously mammals, such as rats, as test objects. Such tests can be performed, for example, according to Winter et al., Proc. Soc. Exp. Biol. & Med. 111, 544 (1962). According to it, the compounds of the invention are applied, in the form of aqueous solutions or suspensions, by stomach tube to male and female rats, in the dosage range between about 1 and 100 mg./kg./day, preferably between about 5 and 50 mg./kg./day, advantageously between about 10 and 25 mg./kg./day. About 1 hour later an aqueous suspension of carrageenin is injected into the rat's paw and any anti-inflammatory activity can be expressed by the reduction of the volume and/or weight of the edematous paw, as compared with the edematous paw volume or weight of untreated or placebo (saline) treated animals. Besides the above-mentioned utility, the compounds of this invention are also useful intermediates in the manufacture of other valuable products, particularly of pharmacologically active compounds.

Valuable compounds are those of Formulae I and II, in which $R_1$ is mono- or dihalogenophenyl, Am is di-lower alkylamino or lower alkyleneimino and $R_2$ is hydrogen or lower alkyl.

Particularly useful are compounds of Formula III

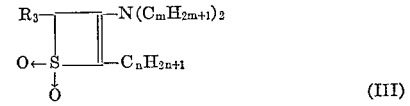

in which $R_3$ is mono or dichlorophenyl and each of $m$ and $n$ is an integer from 1 to 4, and their 4H-tautomers.

Especially valuable are the compounds of Formula III, in which $R_3$ is mono- or dichlorophenyl and each of $m$ and $n$ is the integer 1 or 2, and their 4H-tautomers.

The compounds of the invention are prepared according to methods known in the art, e.g. by (a) reacting an $R_1$-methanesulfonyl halide with a ketone O,N- or N,N-acetal, e.g. compounds of the formulae

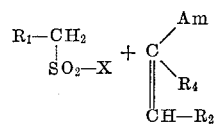

in which X is a halogen atom and $R_4$ is a lower alkoxy or another Am group, or (b) reacting an $R_1$-methanesulfonyl halide with a tert.

amino-lower alkyne or aralkyne, e.g. compounds of the formulae

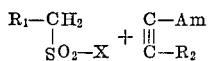

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of reactive derivatives or salts thereof. Mainly, those starting materials should be used in the process of the invention that lead to the formation of those compounds indicated above as being specially valuable.

The starting material used is known or, if new, may be prepared according to known methods, e.g. those described in Agnew. Chem. 1967, p. 767 (744), J. Org. Chem. 30, 71 (1965) or J. Chem. Soc. (C), 1968, 1613.

The compounds of the invention can be used, for example, in the form of pharmaceutical or veterinary compositions, containing them in conjunction or admixture with inorganic or organic, solid or liquid pharmaceutical excipients suitable especially for enteral, but also parenteral or topical administration. Suitable excipients are substances that do not react with the compounds of the invention, for example, water, gelatine, gums, sugars, e.g. lactose, glucose or sucrose, starches, e.g. corn starch or arrow-root, stearic acid or salts thereof, e.g. magnesium or calcium stearate, talc, alcohols, e.g. stearyl or benzyl alcohol, propylene glycol or polyalkylene glycols, alginic acid and other known medicinal excipients. The compositions may be, for example, tablets or pills, e.g. micropills, or in liquid form as solutions, suspensions or emulsions. They may be sterilized and/or contain adjuvants, such as preserving, stabilizing, wetting or emulsifying agents, solution promoters, salts for regulating the osmotic pressure or buffers. They are prepared by conventional methods and contain about 0.1 to 75%, more particularly, 1 to 50%, of the active ingredient.

The following examples are intended to illustrate the invention and are not to be construed as being limitations thereon. Temperatures are given in degrees centigrade, and all parts wherever given are parts by weight.

EXAMPLE 1

To the mixture of 10 g. 1-diethylamino-1-propyne, 9.5 g. triethylamine and 50 ml. tetrahydrofuran, the solution of 20.3 g. 2-chlorophenyl-methanesulfonyl chloride in 50 ml. tetrahydrofuran is added dropwise while stirring under nitrogen and keeping the temperature at −10°. The reaction mixture is allowed to warm up to room temperature and is stirred for two hours. It is filtered, the filtrate evaporated in vacuo and the residue triturated with diethyl ether. It is filtered off, washed with ethanol and diethyl ether, to yield the 2-(2-chlorophenyl)-3-diethylamino-4-methyl-2H-thiete-1,1-dioxide of the formula

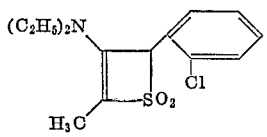

melting at 112–114°.

Upon several recrystallizations of this material from acetonitrile-diethyl ether, the 4H-tautomer of the formula

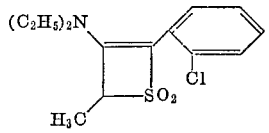

is obtained melting at 118–120°. The extent of this conversion (evidenced by a bathochromic shift in the U.V.-spectrum) is dependent on how carefully the initial 2H-compound is washed with ethanol, duration of heating in the purification, and presence of water in the media used in the reaction and purification. Trace amounts of substances providing a proton are usually sufficient to cause this tautomerization.

EXAMPLE 2

To the mixture of 10 g. 1-diethylamino-1-propyne, 9.5 g. triethylamine and 50 ml. tetrahydrofuran, the solution of 20.3 g. 4-chlorophenyl-methanesulfonyl chloride in 50 ml. tetrahydrofuran is added dropwise during 45 minutes while stirring and keeping the temperature at −10°. It is stirred for two hours at room temperature, filtered and the filtrate evaporated in vacuo. The residue is triturated with diethyl ether, filtered and washed with ethanol and diethyl ether, to yield 2-(4-chlorophenyl)-3-diethylamino-4-methyl-2H-thiete-1,1-dioxide of the formula

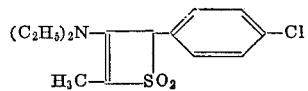

melting at 115–116°.

The material obtained is recrystallized twice from acetonitrile-diethyl ether, to yield a mixture containing 85% of the 4H-tautomer (besides 15% of the 2H-tautomer), melting at 87–90°.

EXAMPLE 3

To the mixture of 13 g. 1-diethylamino-1-propyne, 12.5 g. triethylamine and 50 ml. tetrahydrofuran, the solution of 30.3 g. 2,4-dichlorophenyl-methanesulfonyl chloride in 60 ml. tetrahydrofuran is added dropwise during one hour while stirring under nitrogen and keeping the temperature at −10°. It is stirred for one hour at room temperature, filtered and the filtrate evaporated in vacuo. The residue is triturated with ethanol and recrystallized from ethyl acetate, to yield the 2-(2,4-dichlorophenyl)-3-diethylamino-4-methyl-2H-thiete-1,1-dioxide of the formula

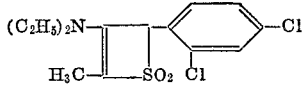

melting at 115–117°.

EXAMPLE 4

To the mixture of 13 g. 1-diethylamino-1-propyne, 12.5 g. triethylamine and 50 ml. tetrahydrofuran, the solution of 30.3 g. 3,4-dichlorophenyl-methanesulfonyl chloride in 50 ml. tetrahydrofuran is added dropwise while stirring under nitrogen and keeping the temperature at −10°. After stirring for two hours at room temperature, the mixture is filtered and the filtrate evaporated in vacuo. The residue is recrystallized from ethyl acetate, to yield the 2-(3,4-dichlorophenyl)-3-diethylamino-4-methyl-2H-thiete-1,1-dioxide of the formula

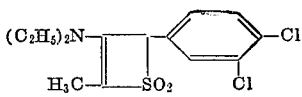

melting at 131–133°.

Upon recrystallization of this material from diethyl ether and ethyl acetate-hexane, a mixture is obtained containing 80% of the 4H-tautomer melting at 88–90°.

EXAMPLE 5

Preparation of 10,000 tablets each containing 25 mg. of the active ingredient:

Formula

| | G. |
|---|---|
| 2 - (3,4-dichlorophenyl) - 3 - diethylamino-4-methyl-4H-thiete-1,1-dioxide (80%) | 250.00 |
| Lactose | 1,956.00 |
| Corn starch | 90.00 |
| Polyethylene glycol 6,000 | 90.00 |
| Talcum powder | 90.00 |
| Magnesium stearate | 24.00 |
| Purified water | Q.s. |

Procedure

All the powders are passed through a screed with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

We claim:

1. An anti-inflammatory pharmaceutical composition comprising an anti-inflammatory effective amount of a member selected from a compound having one of the formulae

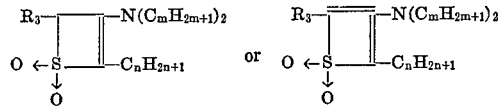

in which $R_3$ is mono- or dichlorophenyl and each of $m$ and $n$ is an integer from 1 to 4, together with a pharmaceutical excipient.

References Cited

Rosen, Tetrahedron Letters, No. 8, February 1969, pp. 647–650.

JEROME D. GOLDBERG, Primary Examiner

U.S. Cl. X.R.

260—243 B, 247.1, 268 FT, 293.4 E, 294.8 D, 326.5 SM, 326.82, 327 R, 329 HS, 332.3 R, 332.5; 424—246, 248, 263, 267, 274